F. A. KINGSBURY.
VEGETABLE SLICING MACHINE.
APPLICATION FILED SEPT. 2, 1915.
1,260,399.
Patented Mar. 26, 1918.
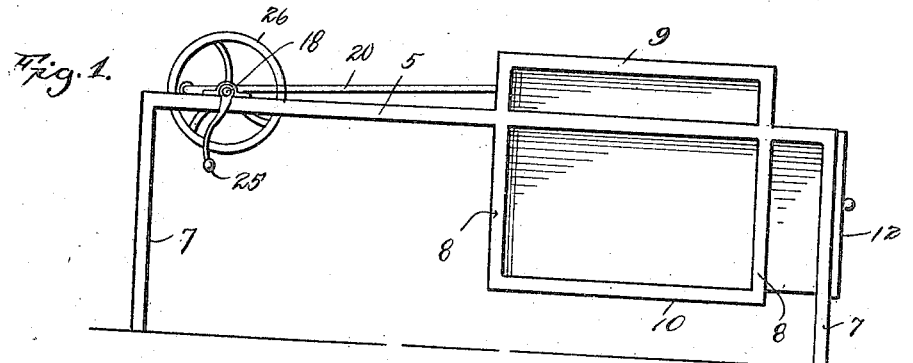
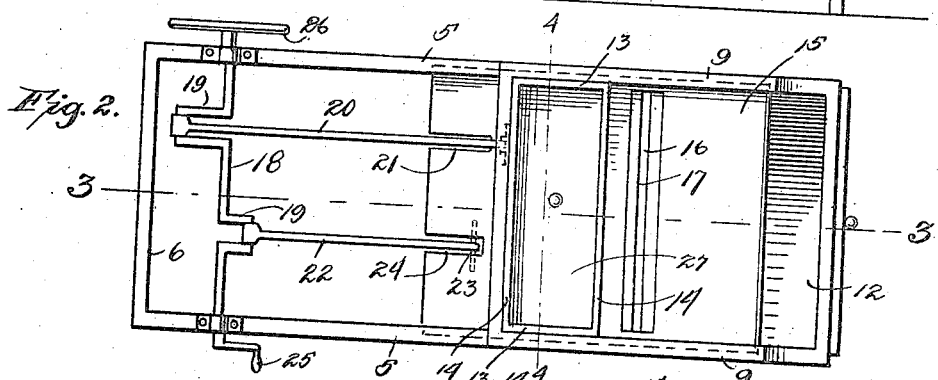
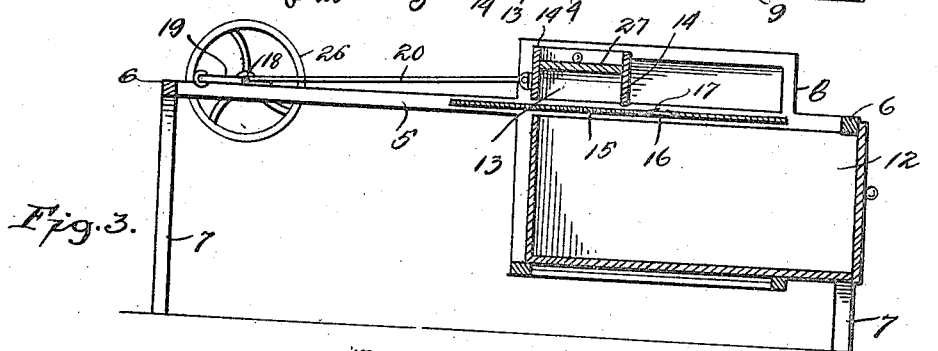
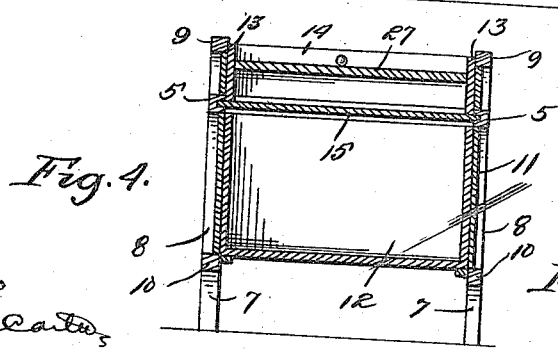
Inventor
F. A. Kingsbury

UNITED STATES PATENT OFFICE.

FRED A. KINGSBURY, OF BOONVILLE, NEW YORK.

VEGETABLE-SLICING MACHINE.

1,260,399. Specification of Letters Patent. Patented Mar. 26, 1918.

Application filed September 2, 1915. Serial No. 48,705.

*To all whom it may concern:*

Be it known that I, FRED A. KINGSBURY, a citizen of the United States, residing at Boonville, in the county of Oneida, State of New York, have invented certain new and useful Improvements in Vegetable-Slicing Machines; and I do hereby declare the following to be a full, clear, and exact description of the invention, such as will enable others skilled in the art to which it appertains to make and use the same.

This invention relates to new and useful improvements in machines for slicing vegetables and particularly directed to such a machine including a hopper and knife members movable across the discharge mouth of the hopper.

It is in general the object of the present invention to simplify the structure and improve the efficiency of machines of this nature, and to this end it is more specifically the object to provide such a machine wherein the hopper and the cutting member move simultaneously in opposite direction to provide a rapid operation.

It is further an object to provide in such a machine an exceedingly simple frame structure which properly supports the various parts of the machine.

With the above and other objects and advantages in view, the invention resides more particularly in the novel combination, formation and arrangement of parts as more fully described hereinafter and pointed out in the appended claims.

Reference is had to the accompanying drawings, wherein similar characters of reference designate corresponding parts throughout the several views, and in which:—

Figure 1 is a side elevation of the improved vegetable slicing machine;

Fig. 2 is a top plan view thereof;

Fig. 3 is a vertical longitudinal sectional view therethrough on the line 3—3 of Fig. 2;

Fig. 4 is a sectional view on the line 4—4 of Fig. 2.

Referring now more particularly to the accompanying drawings, the improved machine is shown as comprising a main frame including the side sills 5, the end sills 6 and the supporting legs 7 at the corners thereof. For slidably supporting the hopper of the machine and for supporting the discharge casing thereof, a pair of spaced vertical bars 8 are secured to each side sill adjacent one end thereof and have their tops connected by a bar 9 and their bottoms connected by a bar 10, and walls 11 are secured to the bars 8 below the sills 5 and to the supporting legs 7 to form a casing which slidably carries a drawer 12 for receiving the sliced vegetables. The hopper comprises a pair of end walls 13 and side walls 14 slidably held between the bars 9. A plate 15 is slidably carried by the sills 5 and extends under the hopper and is provided thereadjacent with a transverse slot 16 in which is positioned a cutting knife 17 and this plate extends under the hopper to form a bottom therefor.

The means for simultaneously moving the plate and hopper in opposite directions comprises a shaft 18 journaled transversely on the sills 5 and provided with a pair of oppositely disposed cranks 19 to one of which is connected a link 20 pivoted to the hopper and working through a longitudinal slot 21 formed in the plate 15. A second link 22 is secured to the other crank and is pivotally connected at 23 to the plate 15 adjacent one end thereof and works in a similar slot 24 in the plate. This shaft is provided with a handle crank 25 at one end and carries a fly wheel 26 at its other end.

A very simple machine has thus been provided which will efficiently perform the functions set forth and which is so designed that it may be readily cleaned. In the operation of the machine, a weighted plate 27 is preferably positioned in the hopper to hold the vegetables down on the knife.

What is claimed is:—

1. In a vegetable slicing machine, a frame, a support slidable on said frame, a knife on the support, a hopper on the frame slidable over the knife, and means connected to the support and hopper for moving the same in opposite directions.

2. In a vegetable slicing machine, a frame, a knife board slidable on said frame and removable therefrom, a knife arranged on the board, a hopper slidable on the frame over said knife, and means connected to the board and hopper for imparting reciprocating motion in opposite directions thereto.

In testimony whereof, I affix my signature, in the presence of two witnesses.

FRED A. KINGSBURY.

Witnesses:
GEORGE HARKNIS,
WALTER KIRLEY.

Copies of this patent may be obtained for five cents each, by addressing the "Commissioner of Patents, Washington, D. C."